United States Patent Office 2,997,207
Patented Aug. 22, 1961

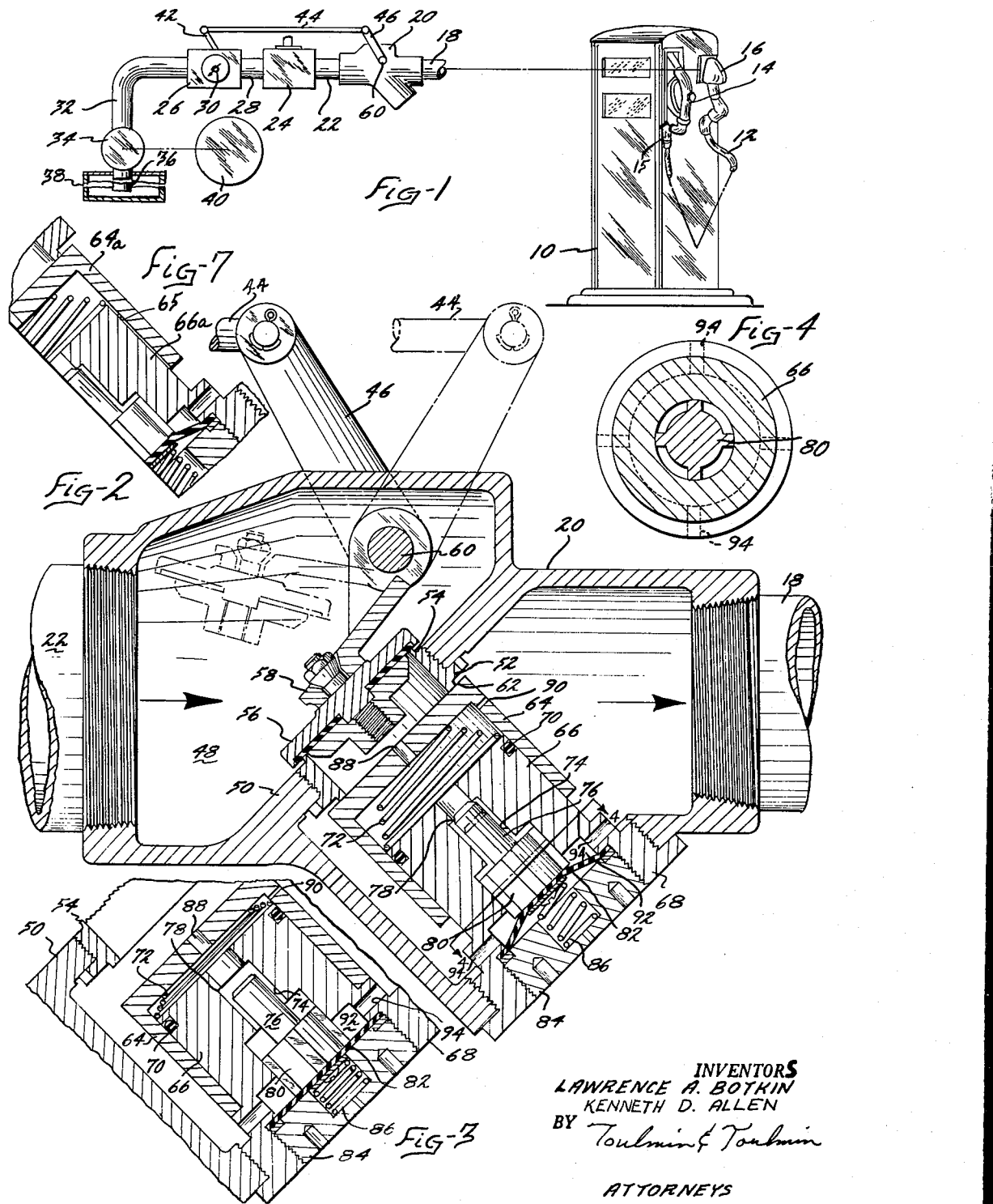

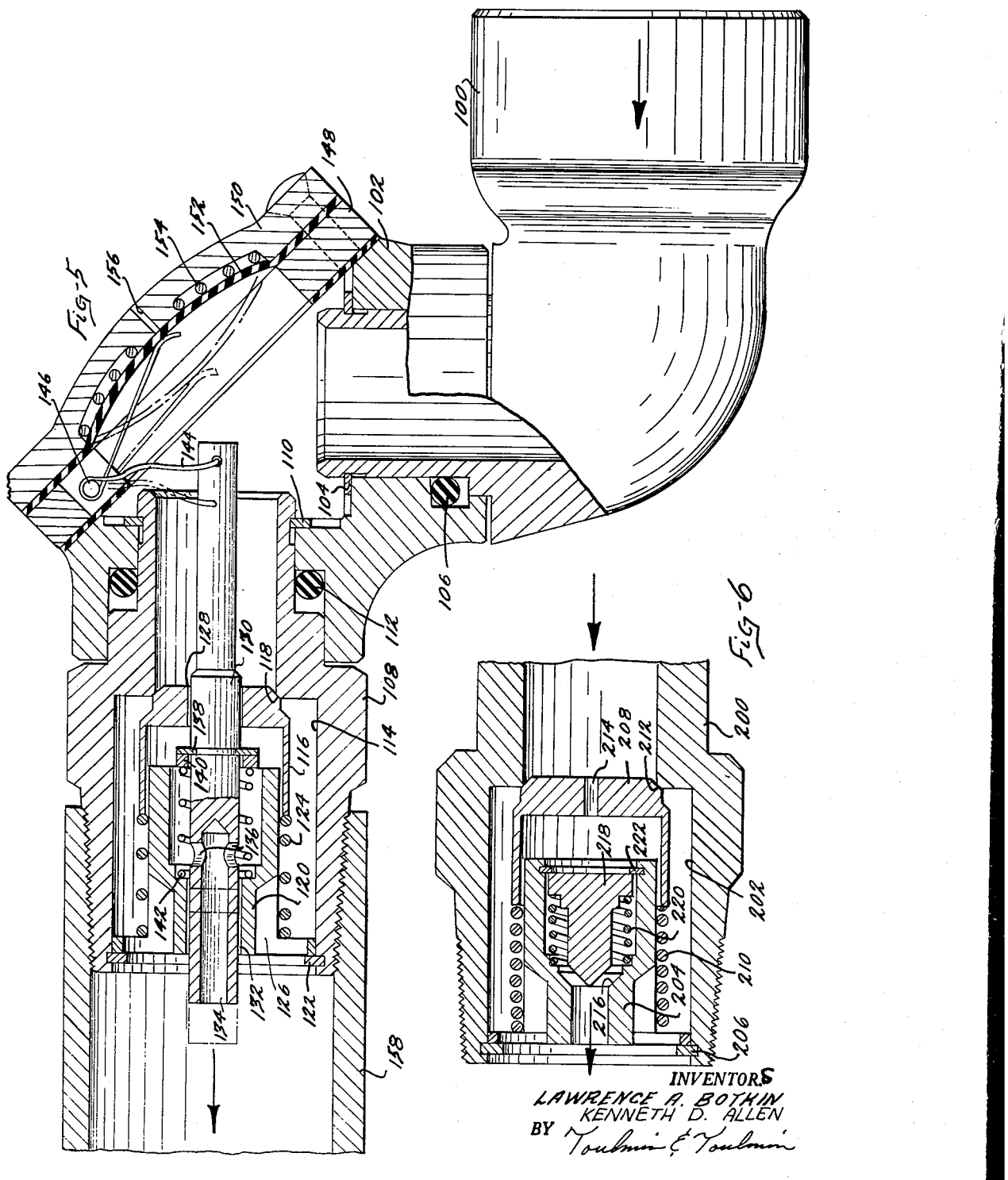

2,997,207
FLOW CONTROL VALVE
Lawrence A. Botkin and Kenneth D. Allen, Dayton, Ohio, assignors to Buckeye Iron & Brass Works, Dayton, Ohio, a corporation of Ohio
Filed Feb. 23, 1960, Ser. No. 10,218
11 Claims. (Cl. 222—59)

This invention relates to a novel valve structure intended primarily for use in connection with fuel dispensing systems having automatic nozzles.

Most filling stations where gasoline is dispensed utilize automatic nozzles for controlling gasoline flow from the hoses of the dispensing units. Some of these nozzles operate merely upon the liquid level in the container being filled and trip closed when the liquid level reaches a predetermined point in the container.

In other instances, the dispensing unit has a presettable metering means which will cause automatic interruption of the delivery of fuel after a predetermined amount, measured either by quantity or cost, has been dispensed. An arrangement of this latter nature usually has a shut-off valve located in the dispensing unit upstream of the hose and therefore upstream of the nozzle.

In the case of either of these two known types of dispensing systems, the interruption of the operation of the pump will serve to interrupt the flow of fluid through the hose and nozzle.

In the event that delivery of the fuel through the hose is stopped either by stopping the pump, or by closing the shut-off valve under the control of the presettable meter, the nozzle remains open unless manually closed. It will be evident that the nozzle in such an event could readily be left open by inadvertence or carelessness and then hanged up on the hose hook whereupon it might occur that at a later time, the open nozzle would be removed from the hose hook and the pump turned on leading to gushing out of gasoline from the nozzle creating an extremely dangerous condition.

With the foregoing in mind, it is a primary object of this invention to provide a safety valve structure, or system, for being included in a fluid flow arrangement such as the liquid fuel dispensing unit referred to which will eliminate the accidental dangerous discharge of fluid from the hose and nozzle under the conditions stated.

A still further object of this invention is the provision of a safety valve which will prevent surges of fluid through a system without there first being equalizing of the pressures on opposite sides of the valve.

A still further object of this invention is the provision of a safety valve of the nature referred to which can be placed in a dispensing system, particularly for liquid fuels such as gasoline, which is sensitive to rates of flow through the dispensing system and operable for limiting the rate of flow increase to an amount which is less than the rate of increase normally encountered when the pump of the unit is turned on with the nozzle open, but greater than the rate of increase encountered when the nozzle is opened manually after the pump has been turned on; and to arrange the device in the system in such a manner that it will not in any way interfere with normal operation of the system and normal flow rates therethrough.

Still another object of this invention is the provision of an arrangement whereby, at the beginning of a dispensing operation which commences with starting the pump of a dispensing unit, there will be only a gradual build up of pressure in the dispensing hose which will eliminate shock loading on the parts of the dispensing unit such as the meter gear train as well as on the hydraulic equipment and will also prevent the dispensing meter from moving any substantial amount which is objectionable to the consumer.

These and other objects and advantages will become more apparent upon reference to the drawings in which:

FIGURE 1 is a rather diagrammatic view showing a dispensing unit for gasoline having a safety valve arrangement according to the present invention therein and embodying a presettable meter device for interrupting the delivery of fluid through the system after a predetermined amount has been dispensed;

FIGURE 2 is a vertical section drawn at enlarged scale through the automatic shut-off and safety valve of the present invention;

FIGURE 3 is a fragmentary view showing the safety valve open;

FIGURE 4 is a transverse section indicated by line 4—4 on FIGURE 2;

FIGURE 5 is a vertical longitudinal section through a modified form of safety device according to this invention;

FIGURE 6 is a sectional view through still another form which the invention can take; and FIGURE 7 is a fragmentary view showing a modification of the FIGURE 2 structure.

Referring to the drawings somewhat more in detail, in FIGURE 1 there is a dispensing unit 10 having a dispensing hose 12 that includes as a part thereof a nozzle 14 preferably of the type which can be latched open to carry out an automatic dispensing operation. Such nozzles are known and generally trip closed automatically when the liquid level in the tank being filled rises to a predetermined point.

The nozzle 14 is connected by a fitting 15 to hose 12 and hose 12 is, in turn connected by a fitting 16 to the unit and within the unit the fitting 16 is connected by a conduit 18 with a valve 20 which forms a portion of the present invention.

This valve receives fluid via a conduit 22 from a meter 24 which will operate the cost computing and quantity indicating mechanism of the dispensing unit. Either included in meter 24 or in the form of a separate instrumentality at 26 which is connected with meter 24 by conduit 28 is a presettable unit comprising a movable element 30 which can be adjusted to indicate a predetermined amount of fuel to be delivered from the unit. This instrumentality is connected by a conduit 32 with the discharge side of pump 34 that has its suction side connected by conduit 36 with a reservoir 38. Motor 40 drives pump 34.

The mechanism at 26 comprises an arm 42 connected by a link 44 with another arm 46 of valve 20.

When the mechanism at 26 is preset arm 42 is moved clockwise thereby moving arm 46 clockwise to open the shut-off portion of the valve 20 and when the amount of fluid for which the mechanism 26 has been adjusted by movable element 30 has been dispensed, arm 42 will be tripped to its FIGURE 1 position thus moving arm 46 to its FIGURE 1 position at which time the shut-off valve closes and the dispensing of liquid by the unit is interrupted.

In FIGURE 2 it will be noted that valve 20 comprises a body having a flow passage 48 therethrough which extends through a wall 50 in which wall is mounted a ring 52 having a seat portion 54 on the upstream side of wall 50 adapted for engagement by shut-off valve disc 56. Disc 56 is attached to an arm 58 so as to have some freedom of motion relative thereto to bring about proper seating of the valve disc on the valve seat.

Arm 58 is fixed to a shaft 60 that extends out the side of the valve body to be attached to the previously referred to arm 46.

On the underside of the ring member 52 there is formed a flat valve seat 62 adapted for engagement by a cup-like piston 64. Piston 64 sealingly but slidably fits over the plug 66 that has thread means at 68 by means of which it is threaded into an aperture in the valve body. O ring means at 70 provide a fluid-tight seal between the plug and the piston 64.

A compression spring 72 is disposed between the upper end of the plug and the inside of the top wall of the piston so that the piston is continuously biased toward seat 62.

Plug 66 is provided with a shouldered bore 74 in which is mounted a valve member 76 formed so as to be provided with a valve seat 78 within the shouldered bore. The lower end of valve member 76 has a fluted head portion 80 that is attached to a diaphragm 82, the periphery of which is clamped against the largest shoulder of the shoulder bore by a clamp nut 84. A spring 86 in a recess in the inside of the clamp nut 84 bears against the diaphragm so as to urge the valve member 76 upwardly into engagement with valve seat 78.

The previously referred to hollow cup-like piston 74 has a passage 88 extending through its top wall and a passage that is somewhat smaller in cross-section as at 90 extending through its side wall so as to communicate the inside of the piston continuously with the downstream end of the flow passage 48.

It will be noted that the diaphragm 82 is disposed so as to be in closing relation to one side of a chamber 92 formed by the largest part of the shoulder bore 74. This chamber is connected by passages 94 with the downstream end of the flow passage 48.

OPERATION OF THE FIRST MODIFICATION

In the modification described above, should valve 56 be closed on its seat and the pump nozzle be left open, the pressure in the downstream end of flow passage 48 through the valve will be low and this will permit springs 72 and 86 to expand thus moving piston 64 into engagement with seat 62 and moving valve member 76 into engagement with valve seat 78. Any leakage of fluid that may occur through the seat 54 about the valve disc 56 will of course readily drain through passages 88 and 90 and will not interfere with the closed position of the piston 64. If, under these circumstances, the arm 46 is operated to lift disc 56 from its seat, the pressure in the upstream end of flow passage 48 will be impressed on both sides of the top of the piston 64 but since the underneath side is somewhat larger in effective area, than the portion of the top side that is exposed inside the valve seat, the piston 64 will remain closed. Some fluid flow will take place through passages 88 and 90 and some may leak between the valve seat 62 and the end of the piston 64 but this will only be a small amount of fluid and not sufficient to create a highly dangerous condition as it dribbles from the nozzle. The operator will, however, have an opportunity to observe the trickling of the fluid and close the valve nozzle thus preventing dangerous conditions from arising.

With the nozzle closed, the pressure will gradually build up within the hose and the conduits leading thereto and in the downstream end of flow passage 48 of the valve 20. As this pressure builds up it will be exerted on the upper face of diaphragm 82 until the diaphragm yields downwardly to its FIGURE 3 position. The yielding of the diaphragm will withdraw valve member 76 from seat 78 and this will permit the escape of fluid from the inside of the hollow piston at a more rapid rate than it is being supplied through passage 88 so the piston will also move downwardly to its FIGURE 2 position thereby opening the valve 20 to fluid flow therethrough. At any time that the pressure downstream of the valve drops to below the preset pressure of the valve, the valve will again close and the cycle described above will be repeated.

Another advantageous effect of introducing the valve of the present invention into the system is that, prior to the commencing of delivery from the nozzle, the shut off valve is opened and the pump is started. Ordinarily, what occurs is that there is some flow of fuel into the hose causing dilation thereof and taking up any air spaces that may be in the hose. Normally, this action is accompanied by a sudden surge of fluid which creates a pressure shock load which is imposed on the hose and the remainder of the hydraulic circuit and there is also an impulse shock load imposed on the meter gear train. All of this is objectionable and is avoided by utilizing the valve of the present invention which permits only gradual pressurization to take place. Further, where the pressurization takes place suddenly there is a tendency for the meter to cause the indicator dials to move perceptibly, and this is, of course, objectionable to the consumer.

MODIFICATION OF FIGURE 5

In the modification of FIGURE 5 there is shown an arrangement which can advantageously be included in a dispensing system as by being built into fitting 15, which is a multi-swivel, that can also be located for example, at the end of the hose adjacent the dispensing unit.

In FIGURE 5 member 100 may be attached to the dispensing unit, although it may also be located between the nozzle and the nozzle end of the dispensing hose.

Member 100 rotatably and sealingly supports an angle member 102 retained in position as by snap ring 104 and sealed by O-ring 106. Angle member 102 in turn supports a fitting 108 which is similarly retained in position by snap ring 110 and sealed by O-ring 112.

Fitting 108 has a shouldered bore 114 therethrough and disposed in the larger downstream end of the bore is a piston 116 adapted for engagement with valve seat 118.

Also mounted in the downstream end of the bore 114 is a plug member 120 which bears against snap ring 122. Plug member 120 has a clearance fit inside the hollow portion of piston 116. A spring 124 surrounds the plug member and biases the piston toward valve seat 118. The downstream end of the plug member is provided with a plurality of slots or grooves 126 through which fluid flows when the valve is opened.

Piston 116 has a hole 128 in the head thereof in the center through which there extends with clearance fit a valve rod 130. Valve rod 130 has a clearance fit also in a bore 132 in plug 120. The plug end of rod 130 has a bore 134 and opening laterally from this bore toward the bottom thereof are ports 136.

A snap ring 138 on the rod under the piston head retains a ring 140 which serves as a bearing for one end of a spring 142 which continuously biases the rod toward its rightwardly position as shown in FIGURE 5.

At the opposite end of the rod 130 there is connected a resilient bellcrank member 144 pivoted at 146 on a ring 148 which is clamped over an aperture in the valve by a cap 150. Beneath cap 150 there is a diaphragm 152 and a spring 154 urges the diaphragm inwardly of the cap with their being a somewhat restricted passage 156 for permitting air to pass through the cap as the diaphragm flexes.

Under normal conditions, with the dispensing nozzle closed and the pressure equalized in the system, the parts will be in the position in which they are indicated in FIGURE 5. If the nozzle is then open fluid from the underside of the piston 116 can readily pass through ports 136 into bore or rod 130 and thence into conduit 158 thus permitting piston 116 to move and open the valve thus permitting fluid flow in a normal manner.

If, on the other hand, the nozzle has been left open and the dispensing pump has been halted, the pressure within the system downstream of the pump and, thus, through the valve, will be zero and this will permit diaphragm 152 to be flexed inwardly under the influence of spring 154 thus shifting valve rod 130 leftwardly until ports 136 are disposed within the portion of plug 120 with which the rod has only slight clearance.

If the pump is now started, there will be a surge of pressure built up within the valve but the valve will be prevented from opening because the fluid entrapped underneath piston 116 will be prevented from escaping. The leakage of fluid from this space between the piston and plug 120 and between plug 120 and rod 130 will be made up by fluid leaking into the piston around rod 130. As the area on the underside of the piston head is greater than the projected area exposed to the upstream fluid in the valve, the piston will remain closed. The aforementioned leakage of fluid past plug 120 will leak or dribble slowly from the nozzle so the operator will observe this condition and will close the nozzle permitting the pressure to equalize within the system so that piston 116 can open.

Should the condition of unequal pressure persist for any substantial length of time the diaphragm 150 will be forced outwardly but the rod 130 will remain in its left hand position due to the high pressure on its inner end as compared to the lower pressure on its outer end and because the spring 142 is relatively weak.

MODIFICATION OF FIGURE 6

In the modification of FIGURE 6 there is shown another arrangement in which normal flow through the dispensing system is prevented should the pump be turned on with the nozzle held in open position. This is accomplished in the modification of FIGURE 6 by detecting the rate of increase of flow through the dispensing system and limiting this increase to a predetermined value less than the rate of increase normally encountered when the pump is turned on with the nozzle open but greater than the rate of flow increase when the nozzle is opened after the pump is on.

In FIGURE 6 there is a fitting 200 having a shouldered bore 202 therein with a plug member 204 projecting inwardly from the downstream larger end of the bore and retained in place by a snap ring 206. A valve piston 208 corresponding to piston 116 of the FIGURE 5 modification has a loose sliding clearance fit on the plug and is biased by a spring 210 toward engagement with valve seat 212. A central passage 214 in the head of the piston communicates the interior thereof with the upstream side.

Plug 204 has a bore therethrough having a valve seat 216 engageable by a valve member 218 biased away from the valve seat by spring 220 and retained in the bore by a snap ring 22. The valve member has a clearance fit in the bore within the plug so that normally fluid can leak past the valve member and through the bore in the plug.

In the modification of FIGURE 6, the spring 210 selected by the overall system requirements so that piston 208 can act as a check valve at the inlet to the nozzle.

The flow passages 214 and the clearance space between the plug 204 and the said piston and between the plug and the valve member 218 are so proportioned that the piston will move to the fully open position upon opening of the nozzle in the normal manner. Since this will maintain the pressure on the underside of the piston head substantially the same as the downstream pressure, the flow passages and spring biases are so selected that the normal flow through passage 214 to the underside of the piston head plus the normal displacement of fluid from underneath the piston head as the piston opens will cause no more than a slight movement of valve member 218 against the bias of its spring 220.

In the event of a surge of flow through the system, such as would occur when turning on the pump with the nozzle in open position, the flow through passage 214 plus the displacement of fluid by the sudden movement of the piston 208 would be of such a magnitude that the pressure drop around the head of the valve member 218 imposed upon the area at the larger end of the valve would cause the valve member to move leftwardly and shut-off further flow from beneath the piston head. Under these circumstances the pressure will build up beneath the piston head since fluid will enter through passage 214 at a more rapid rate than can escape therefrom around plug 120. The piston will then move rightwardly to closed position and the piston will remain in this position until the nozzle has been shut-off and the pressure equalized.

Any slight leakage through the system will merely serve as an indication that the dispensing nozzle should be closed.

The modification of FIGURE 6 as well as that of FIGURE 5 lends itself well to being included in the system adjacent the nozzle but it will be understood that these devices could be located at any suitable place within the system such as within the dispensing unit between the pump and the point of connection of the dispensing hose with the unit.

It has been found through test and experiment that the structure of FIGURE 2 can be somewhat modified with satisfactory results obtaining by eliminating the bleed ports 90 and the seal 70 and depending upon leakage between the piston and plug to obtain the pressurizing characteristics desired.

Such a modification is illustrated in FIGURE 7 wherein it will be noted that piston 64a has the ports 90 eliminated therefrom and that plug 66a has had seal ring 70 eliminated therefrom. Instead of ports 90 there is a controlled clearance 65 between the piston and plug, the function of which corresponds to the function of the bleed ports 90 in FIGURE 2. It will be understood that the operation of the FIGURE 7 modification would be exactly the same as the operation of the modification of FIGURE 2.

It will be understood that this invention is susceptible to modification in order to adapt it to different usages and conditions; and, accordingly, it is desired to comprehend such modifications within this invention as may fall within the scope of the appended claims.

We claim:

1. In a safety valve system; a valve body having a flow passage therethrough with a valve seat, a valve member engageable with said seat from the downstream side, a member stationary in the valve body on the downstream side of the valve member in sliding telescoping engagement therewith, said members defining a chamber therebetween having a larger area than the area of the valve member that is exposed to upstream pressure when the valve member is closed, first passage means connecting the upstream side of the valve seat with said chamber, second passage means connecting said chamber with the downstream side of the valve seat, a pilot valve in said second passage means having open and closed positions so that when the pilot valve is open the valve member will open in response to pressure in the flow passage upstream thereof and when the pilot valve is closed pressure will be maintained in said chamber and prevent said valve member from opening, and means comprising spring means acting on the pilot valve and radial areas on the pilot valve exposed respectively, to the pressures upstream and downstream of the pilot valve for moving the pilot valve between its open and closed positions, said means being operable to cause closing of said pilot valve in response to a predetermined reduced pressure on the downstream side thereof.

2. In a safety valve system; a valve body with a flow passage therethrough having a valve seat, a valve member on the downstream side of the seat spring urged toward the seat, said valve member having a skirt extending therefrom on the downstream side, a plug member in the valve body extending into the skirt to form a chamber, a passage in the valve member connecting the chamber with the upstream side of the valve member, a pilot valve having open and closed positions connected between the chamber and the downstream end of the flow passage, a spring urging said pilot valve toward one of its said positions, and means responsive to a predetermined reduced pressure in the downstream end of the flow passage upon the establishment of pressure on the upstream side of said valve member for moving said pilot valve to closed position.

3. In a safety valve system; a valve body with a flow passage therethrough having a valve seat, a valve member on the downstream side of the seat spring urged toward the seat, said valve member having a skirt extending therefrom on the downstream side, a plug member in the valve body extending into the skirt to form a chamber, a passage in the valve member connecting the chamber with the upstream side of the valve member, a pilot valve having open and closed positions connected between the chamber and the downstream end of the flow passage, a spring urging said pilot valve toward open position, and means responsive to a predetermined reduced pressure in the upstream end of the flow passage for moving said pilot valve to closed position, there also being means responsive to an increase in pressure in the upstream end of the flow passage above said predetermined reduced pressure operable in the absence of pressure in the downstream end of the flow passage to prevent the pilot valve from moving from its closed position.

4. In a safety valve system; a valve body with a flow passage therethrough having a valve seat, a valve member on the downstream side of the seat spring urged toward the seat, said valve member having a skirt extending therefrom on the downstream side, a plug member in the valve body extending into the skirt to form a chamber, a passage in the valve member connecting the chamber with the upstream side of the valve member, a pilot valve having open and closed positions connected between the chamber and the downstream end of the flow passage, a spring urging said pilot valve toward open position, a diaphragm in the valve exposed to atmospheric pressure on one side and to pressure in the upstream end of the flow passages on the other side and spring biased to flex in one direction when the pressure in said upstream end of the passage falls below a predetermined amount, an abutting connection between the diaphragm and pilot valve operable to close the pilot valve when the diaphragm so flexes, and said pilot valve having oppositely disposed actuating areas exposed to the pressures in the upstream and downstream ends, respectively, of the flow passage whereby after the pilot valve is closed it can open only when there is less than a predetermined difference in pressure between the upstream and downstream ends of the flow passage.

5. In a safety valve system; a valve body with a flow passage therethrough having a valve seat, a valve member on the downstream side of the seat spring, urged toward the seat, said valve member having a skirt extending therefrom on the downstream side, a plug member in the valve body extending into the skirt and forming a chamber therewith and with the head of the valve member, a passage in the head of the valve member connecting the chamber with the upstream side of the valve member, a passage leading from the chamber to the downstream end of said flow passage, a pilot valve in said last mentioned passage spring urged toward opening position and movable to close the said passage, and means responsive to a predetermined pressure differential extending across said pilot valve member for moving said pilot valve member into passage closing position.

6. In a safety valve system; a valve body with a flow passage therethrough having a valve seat, a valve member on the downstream side of the seat spring urged toward the seat, said valve member having a skirt extending therefrom on the downstream side, a plug member in the valve body extending into the skirt and forming a chamber therewith and with the head of the valve member, a passage in the head of the valve member connecting the chamber with the upstream side of the valve member, a passage leading from the chamber to the downstream end of said flow passage, a pilot valve in said last mentioned passage spring urged toward opening position and movable to close the said passage, there being a leakage path around said pilot valve member so that a reduced rates of fluid flow past the pilot valve member the said chamber can be drained and permit the main valve member to open whereas at flow rates above a predetermined amount past the pilot valve member the pressure differential thereacross will cause the pilot valve member to move into closed position thereby entrapping fluid in said chamber and preventing the main valve member from opening whereby fluid surges through the flow passage are eliminated.

7. In a safety valve system; a valve body with a flow passage therethrough having a valve seat, a valve member on the downstream side of the seat spring urged toward the seat, said valve member having a skirt extending therefrom on the downstream side, a plug member in the valve body extending into the skirt to form a chamber, a passage in the valve member connecting the chamber with the upstream side of the valve member, a pilot valve having open and closed positions connected between the chamber and the downstream end of the flow passage, a spring urging said pilot valve toward closed position, a diaphragm connected to the pilot valve responsive to downstream pressure in said flow passage for opening said pilot valve whereby the said valve member is prevented from opening when the pressure in the downstream end in the flow passage is below a predetermined amount.

8. A safety valve system; a valve body having a flow passage therethrough, a wall in the valve body intermediate the ends, an aperture in said wall for communicating the upstream and downstream ends of said passage, a seat around the aperture on both sides of the wall, a check valve member associated with the upstream seat adapted for being opened to permit flow through the valve or closed to interrupt the said flow, a valve member engaging the seat on the downstream side, said valve member having a skirt extending therefrom on the downstream side, a plug member in the valve body extending into the skirt to form a chamber, a passage in the valve member connecting the chamber with the upstream side of the valve member, a pilot valve having open and closed positions connected between the chamber and the downstream end of the flow passage, a spring urging said pilot valve toward closed position, a diaphragm connected to the pilot valve responsive to downstream pressure in said flow passage for opening said pilot valve whereby the said valve member is prevented from opening when the pressure in the downstream end in the flow passage is below a predetermined amount.

9. In combination; a fuel dispensing unit having a pump within the unit, a flexible hose connected with the pump and leading from the unit and a dispensing nozzle on the end of the hose, and means between the nozzle and the pump interposed in the fluid flow passage therebetween comprising normally closed valve means adapted to open in response to fluid flow from the pump to the hose and operable for closing to prevent fluid flow through the said flow passage whenever the said flow tends to increase at a more rapid rate than would obtain upon opening the nozzle with the said pump running.

10. In combination; a fuel dispensing unit having a pump within the unit, a flow passage leading from the pump, a flexible hose connected to the end of the flow passage opposite the pump and leading from the unit and a dispensing nozzle on the end of the hose, a valve in the flow passage presettable for interrupting the flow therethrough in response to a predetermined stimulus such as the quantity of fluid dispensed, and another valve in the flow passage downstream of said first mentioned valve adapted for closing when fluid flow through said passage is interrupted and for remaining closed until the pressure on opposite sides thereof is substantially equalized thereby preventing the flow from being re-established upon opening of the first mentioned valve before the nozzle has been closed.

11. In combination; a fuel dispensing unit having a pump within the unit, a flow passage leading from the pump, a flexible hose connected to the flow passage to the end opposite the pump and leading from the unit, and a dispensing nozzle on the end of the hose, a valve in the flow passage between the pump and the hose upstream of the nozzle spring urged toward closed position and adapted for opening in response to the opening of the nozzle and the initiation of fluid flow through the flow passage, said valve being operable for closing upon interruption of flow through the flow passage upon closing of the nozzle whereupon pressure can build up freely only upstream of the valve, and there being restricted passage means through the valve when closed permitting only gradual build up of pressure in the hose following closing of the nozzle and whereby hose dilation under these circumstances occurs at only a substantially imperceptible rate.

References Cited in the file of this patent

UNITED STATES PATENTS

| | | |
|---|---|---|
| 2,512,190 | Waterman | June 20, 1950 |
| 2,555,334 | Green | June 5, 1951 |
| 2,796,090 | Carriol | June 18, 1957 |
| 2,841,191 | Fraser | July 1, 1958 |

FOREIGN PATENTS

| | | |
|---|---|---|
| 943,916 | France | Mar. 22, 1949 |